United States Patent
Mil'shtein et al.

(10) Patent No.: US 6,961,449 B2
(45) Date of Patent: Nov. 1, 2005

(54) METHOD OF CORRELATION OF IMAGES IN BIOMETRIC APPLICATIONS

(75) Inventors: Samson Mil'shtein, Chelmsford, MA (US); Joel Therrien, Urbana, IL (US)

(73) Assignee: University of Massachusetts Lowell, Lowell, MA (US)

( * ) Notice: Subject to any disclaimer, the term of this patent is extended or adjusted under 35 U.S.C. 154(b) by 476 days.

(21) Appl. No.: 10/050,691

(22) Filed: Jan. 16, 2002

(65) Prior Publication Data

US 2002/0146155 A1 Oct. 10, 2002

Related U.S. Application Data

(60) Provisional application No. 60/262,093, filed on Jan. 16, 2001.

(51) Int. Cl.⁷ .............................................. G06K 9/00
(52) U.S. Cl. ..................... 382/115; 382/232; 382/278; 340/5.83; 283/68
(58) Field of Search ................. 382/115–119, 124–125, 382/190, 209, 210, 218, 251, 276, 280, 232; 340/5.8, 5.11, 5.81, 5.82, 5.83; 356/71; 283/68–70; 380/229; 713/186; 359/561

(56) References Cited

U.S. PATENT DOCUMENTS

| | | | | |
|---|---|---|---|---|
| 5,187,755 A | * | 2/1993 | Aragaki | 382/239 |
| 5,351,310 A | | 9/1994 | Califano et al. | 382/22 |
| 5,633,944 A | | 5/1997 | Guibert et al. | 382/100 |
| 5,703,970 A | | 12/1997 | Atashroo | 382/278 |
| 5,892,838 A | * | 4/1999 | Brady | 382/115 |
| 6,108,458 A | | 8/2000 | Hart | 382/278 |
| 6,137,896 A | | 10/2000 | Chang et al. | 382/118 |
| 6,195,447 B1 | * | 2/2001 | Ross | 382/125 |
| 6,226,391 B1 | * | 5/2001 | Dydyk et al. | 382/125 |
| 6,292,575 B1 | * | 9/2001 | Bortolussi et al. | 382/118 |
| 6,301,370 B1 | | 10/2001 | Steffens et al. | 382/103 |
| 6,501,857 B1 | * | 12/2002 | Gotsman et al. | 382/224 |
| 6,795,570 B1 | * | 9/2004 | Eichhorn et al. | 382/124 |

* cited by examiner

Primary Examiner—Bhavesh M. Mehta
Assistant Examiner—Sheela Chawan
(74) Attorney, Agent, or Firm—Hamilton, Brook, Smith & Reynolds, P.C.

(57) ABSTRACT

A method and apparatus for computing correlating images for image recognition is provided. In particular, the method is used to compare images of a biometric object to authorize an individual or verify whether an individual is the person he claims to be. The biometric objects may include fingerprints, hand or palm prints, and retina scans. The method uses a deviation of symmetry of correlation functions to determine whether the images are of a same object.

17 Claims, 4 Drawing Sheets

METHOD OF CORRELATION OF IMAGES IN BIOMETRIC APPLICATIONS

RELATED APPLICATION

This application claims the benefit of U.S. Provisional Application No. 60/262,093, filed on Jan. 16, 2001, entitled "Method of Reliable Correlation of Images in Biometric Applications," by Mil'shtein et al. The entire teachings of the above application are incorporated herein by reference.

BACKGROUND OF THE INVENTION

Image correlation is useful in several areas of practical application. For example, image recognition systems often use correlation of an acquired actual image and a reference image for comparison. In particular, images of biometric objects such as faces, retinas scans, fingerprints, and hand or palm prints, are compared using the image recognition systems to identify an individual or verify whether an individual is the person he claims to be for security. Image correlation is typically performed using Fast Fourier Transforms (FFTs), image shifting, or optical transformation techniques.

SUMMARY OF THE INVENTION

These techniques for image correlation, however, require extensive processing of the images in hardware or software. The computational load increases significantly as the image resolution increases. For an image having N×N pixels, for example, FFT techniques require on the order of $N^2 \log N$ iterations while image shifting techniques require $\Delta^2 N^2$ iterations, where $\Delta$ is the length of the correlation search in pixels. Further, image correlation requires the actual image to be in alignment with the reference image so that the coordinate system of the actual and reference images are in the same orientation and position. Furthermore, the presence of background noise in the images makes the pixel-by-pixel comparison of images very difficult.

The image correlation process and apparatus of the present invention provides several orders of magnitude in increased processing speed over known image correlation processing techniques by compressing images into image projections and employing deviation of symmetry of image projections. In addition, the image correlation system of the present invention does not require massive computational power nor a powerful processor. Instead, much smaller chips like memory shifters or Digital Signal Processing (DSP) chips can be used. In addition, the present invention reduces a significant amount of noise usually found in an optical image for a more accurate comparison. Further, a precise alignment of images being compared to avoid errors in prior image correlation methods is not needed in the present invention.

The present image correlation process may be used to compare images. The image correlation process includes compressing a first image into a first image projection and a second image into a second image projection. The first and second image projections may be in one-dimensional format to simplify the application of correlation functions. The images may be compressed by summing the pixels in each column and row for x and y projections respectively.

Once the images are compressed, the deviation of symmetry of the first and second projections are determined to compare the images. The deviation of symmetry is determined by providing a correlation function and locating a correlation peak. The correlation function is performed at a first point near the correlation peak and a second point near the correlation peak to determine first and second correlation results. In addition, the correlation function is performed at the correlation peak to determine the peak correlation result. The first and second points may be on the opposite sides of the peak and at about the same distance from the peak. The deviation of symmetry is determined by computing a difference between the first and second correlation results and dividing the difference by the peak correlation result.

A predetermined threshold is provided to determine whether the first and second images are the images of a same object. A few percent deviation from symmetry may indicate that the correlation function has compared the images of two different objects. However, if the deviation of symmetry is small and less than the threshold value, then the first and second images are the images of the same object.

The image correlation process may be used to authenticate an acquired image by comparing it with a predetermined reference image for security in sensitive government and commercial installations. In addition, matching for personal identification has application wherever a person's identity needs to be identified or verified, such as in the control of access to physical locations, such as airports, industrial locations and in the home.

The correlation function includes a displacement parameter to align the first and second images. In addition, background noise in image projections are reduced by subtracting an average background constant from the correlation function.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention relates to correlating images of biometric objects. The present invention uses the deviation of symmetry of correlation functions to compare images. In general, a correlation of images yield a result, in the form of a discretized function of the offset of the data sets being compared. If the images being compared are describing the same object then there is a symmetry of correlation functions. The degree of symmetry provides the closeness of fit between the images. For example, a few percent deviation from symmetry indicates that the correlation function is comparing two different images.

In particular, the present image correlation process may be used to compare prerecorded reference image and an actual acquired image of a biometric object such as fingerprints. The reference image may be stored in memory and the actual image may be acquired using an image capturing device.

Figure 1:
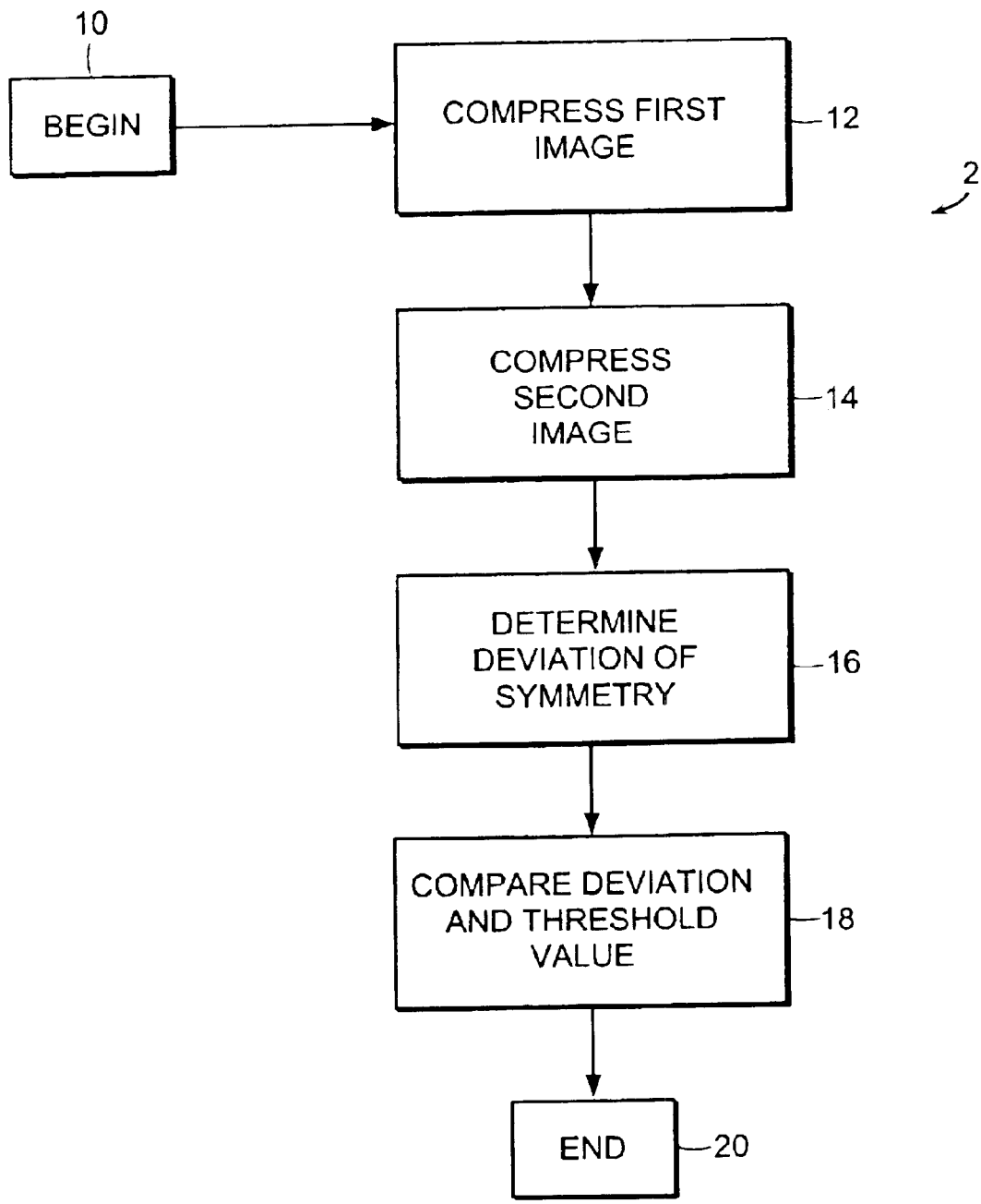
FIG. 1 is a flow chart of an image correlating process according to the invention.

FIG. 1 is a flow chart of an image correlating process 2 according to the invention. The process begins at step 10. Since it is computationally intensive to apply recognition algorithms to images, resulting from two dimensional nature of images, the images are compressed into one-dimensional format projections at 12 and 14. The projections preserve sufficient details of the images to make the image recognizable. The compression may consist of taking the projection of an image in the x and y directions. For example, the x projection of the image is computed by summing the pixels in each column. Similarly, the y projection of the image is computed by summing the pixels in each row. At 12, the first image is compressed into a first image projection. Similarly, at 14, the second image is compressed into a second image projection. The first and second image projections may each include x and y projections of the respective images.

In the case of fingerprints, this compression process may obliterate information about the ridges of the fingerprint, but does not obliterate information about breaks, bifurcations and curvature of the fingerprint. The lack of information about the ridges does not pose a problem because many recognition algorithms focus exclusively on breaks and bifurcations. The breaks and bifurcations appear in the form of short period changes in the projections. The curvature information appear as longer period variations in the projection. This projection technique may also be applied to the Fourier transform of the images with no modification.

Figure 2:
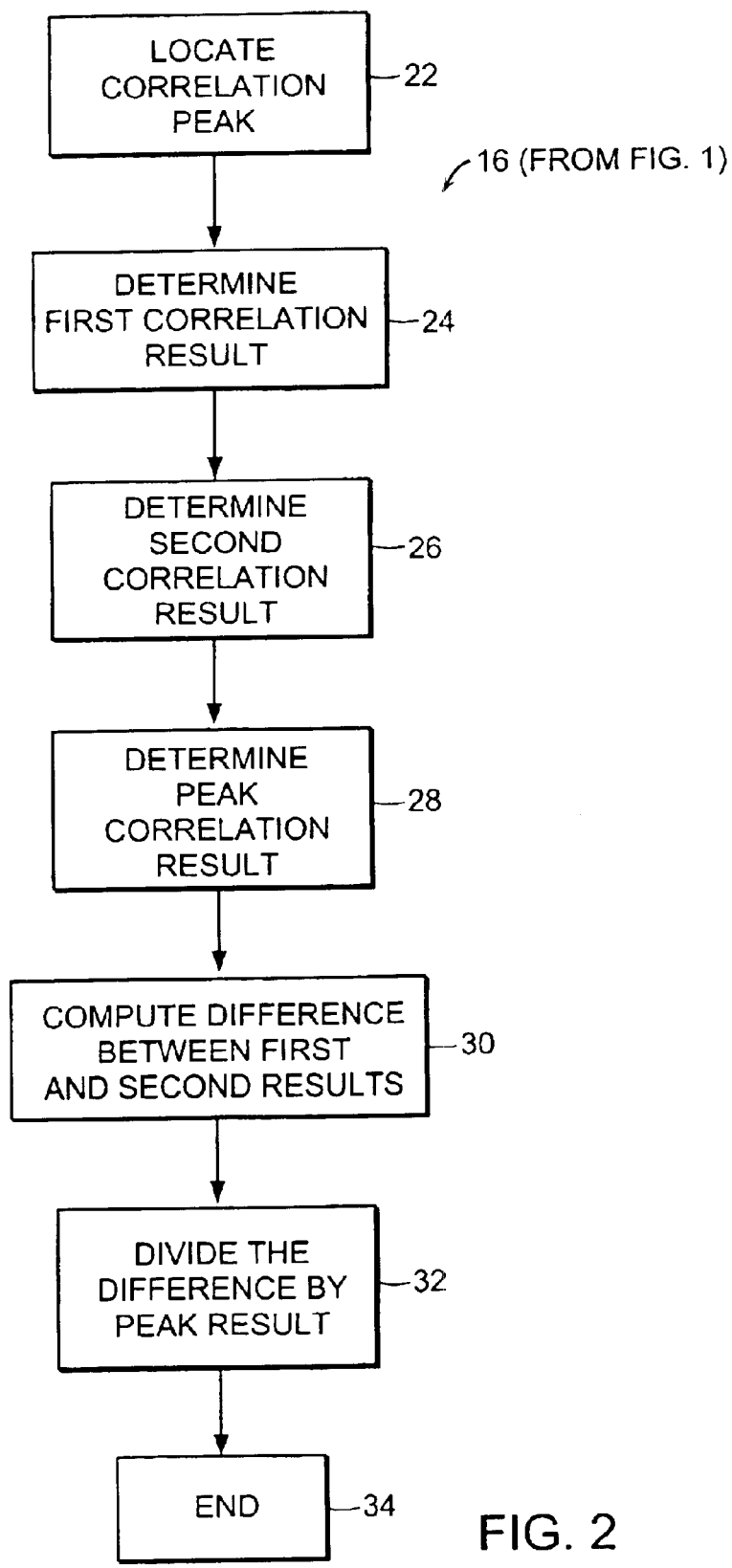
FIG. 2 is a flow chart of a deviation of symmetry process of FIG. 1.

Once the images have been compressed, the deviation of symmetry of the first and second projections is determined at 16. FIG. 2 is a flow chart of a deviation of symmetry process 16 of FIG. 1. The deviation of symmetry is determined using a correlation function.

A correlation function produces a linear and discretized set of data, which is a function of the relative displacement between the two projections:

$$C(\delta) = \sum_{n=0}^{max} projection_1(n) \times projection_2(n+\delta) \quad [1]$$

where n represents the individual components of a projection and δ is the displacement of the image.

According to Equation 1, in the event that the projections are the same, e.g. the images are the same, then the correlation function C(δ) is symmetric around δ=0. If one of the images is shifted, the function is symmetric around δ=−d where d is the displacement along the projection of the second image relative to the first.

One of the problems in correlating images, especially for fingerprints, is caused by images that have a uniform background. As δ increases, the overlap of the two projections decreases. Each projection can be considered as a function riding on top of a uniform background, represented as a constant average. Then, the correlation function can be rewritten as such:

$$max = |datalength - \delta| \quad [2]$$

$$projection(n) = prj(n) + avg$$

-continued $$C(\delta) = \left\{ \sum_{n=0}^{max} prj_1(n) \times prj_2(n) + prj_1(n) \times avg_2 + prj_2(n) \times avg_1 \right\} +$$

$$max \times avg_1 \times avg_2$$

As shown in Equation 2, the correlation function has a component that linearly decreases as a function of δ. If the background constants $avg_1$ and $avg_2$ are larger than the variance of $prj_1(n)$ and $prj_2(n)$, then the component of the correlation function due to the background overwhelms the component due to the fingerprint data. To overcome this, the average value may be subtracted out. Thus, the background value is subtracted from the projection pixels.

The sensitivity of the correlation function for short range variations in the projections extend near a correlation peak. For example, the part of the correlation function which is sensitive to the breaks and bifurcations in the fingerprint extends only a short distance from the peak. However, the sensitivity of the correlation function for longer-range variations in the projections extends much farther. For example, the correlation function is sensitive to the general curvature of the fingerprint across the whole function. Thus, if the images of the same object is compared, then there is a symmetry near the peak. However, if the images of different objects are compared, then there is a deviation from symmetry due to the sensitivity of the correlation function near the correlation peak.

The symmetry of image projections is determined by locating the peak value of the correlation function C(δ) and folding the correlation function. As illustrated in Equation 3 below, the correlation function is folded by performing the correlation function at Δ+δ and Δ−δ, and calculating the difference between the two, where Δ represents the correlation peak. The correlation peak is associated with Δ=−d. Thus, a symmetry function is constructed:

$$S(\delta) = \frac{|C(\Delta + \delta) - C(\Delta - \delta)|}{C(\Delta)} \quad [3]$$

The symmetry function is normalized by dividing by the peak correlation result determined by performing the correlation function at C(Δ). With the normalization, the symmetry function returns the percentage deviation of symmetry as a function of distance from the center. In practicality, the two images are not exactly the same. Therefore, the center of symmetry may not be located exactly at the peak in the correlation function.

Similarly, to determine the deviation of symmetry of the first and second projections, a correlation peak is determined at 22. At 24, the correlation function is computed at a first point near the correlation peak, Δ+δ, to determine a first correlation result. Similarly, at 26, a second correlation result is determined for a second point near the correlation peak, Δ−δ. In addition, a peak correlation result is determined by performing the correlation function at the correlation peak, Δ, at 28. Once the first and second results are determined, the difference between the first and second results is computed, at 30, to determine the deviation of symmetry. At 32, the difference is divided by the peak correlation result to provide the percentage deviation of symmetry. The symmetry process ends at 34.

Referring again to FIG. 1, once the deviation of symmetry is determined at 16, the deviation of symmetry is compared to a threshold predetermined by a user to determine whether the first and second images are the images of a same object.

Figure 3B:
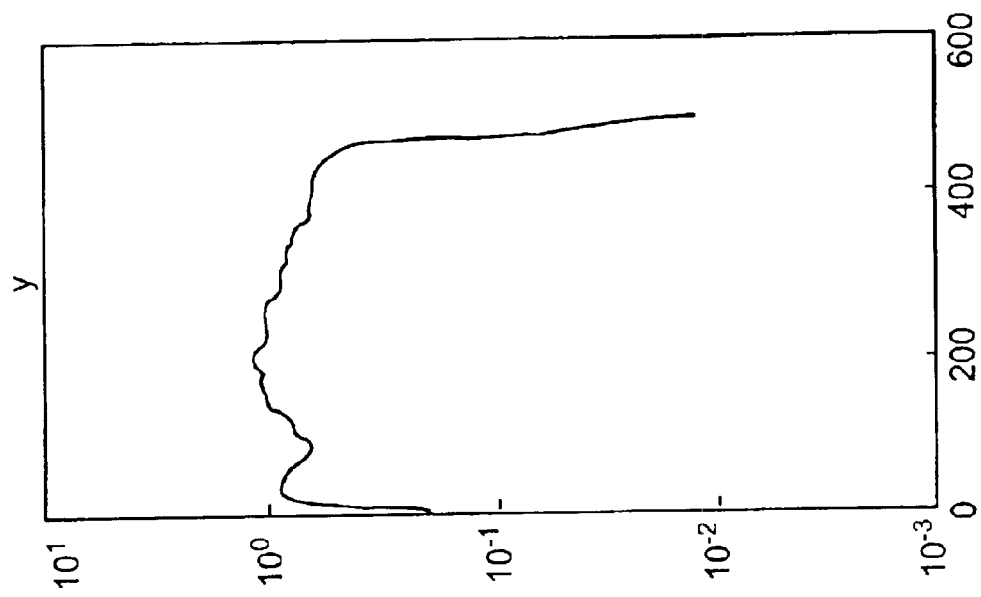
FIGS. 3A–3B are diagrams showing the deviation of symmetry of x and y projections of a correlation function when the images of the same object are compared.
Figure 3A:
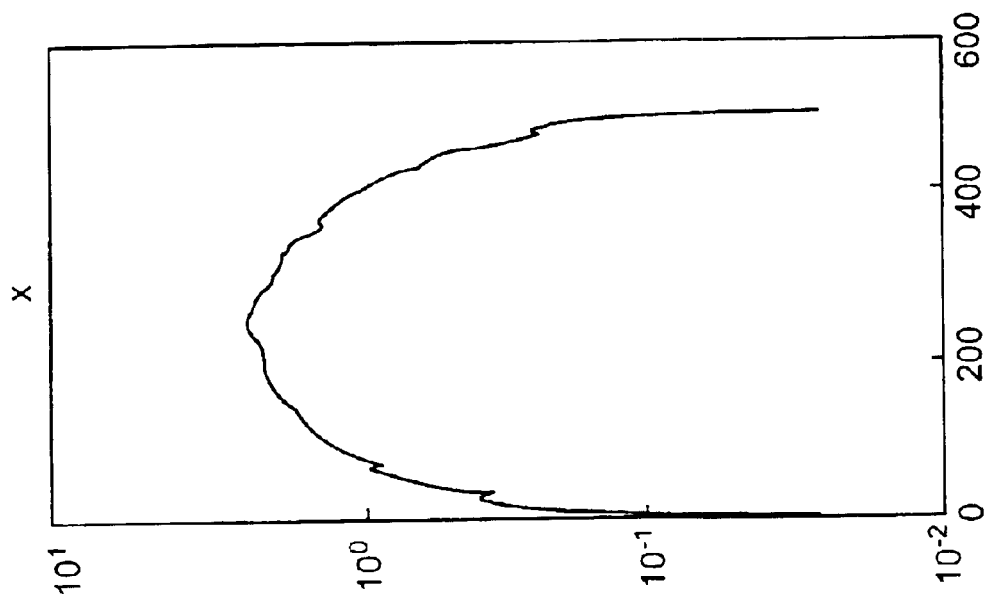

FIGS. 3A and 3B illustrate the deviation of symmetry of x and y projections of a correlation function when the images of the same object are compared. In particular, FIG. 3A illustrates a plot of the deviation of symmetry (in %) versus the distance from the center of symmetry for the x projection of the correlation function. FIG. 3B illustrates a plot of the deviation of symmetry (in %) versus the distance from the center of symmetry for the y projection of the correlation function. FIGS. 3A and 3B show a small degree of deviation from symmetry ($10^0$). In fact, almost no deviation is observed in the y projection of FIG. 3B. Accordingly, the compared images are the images of the same object. The correlation function may be an autocorrelation function to compute the degree to which the images replicate each other. In addition, one of the images was rotated about 5°.

Figure 4B:
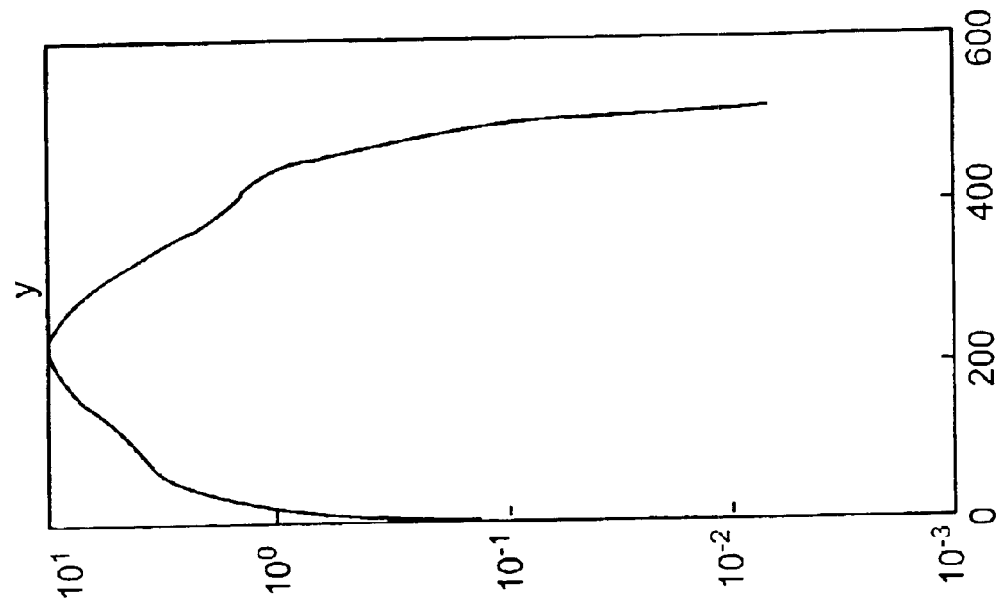
FIGS. 4A–4B are diagrams showing the deviation of symmetry of x and y projections of a correlation function when the images of two different objects are compared.
Figure 4A:
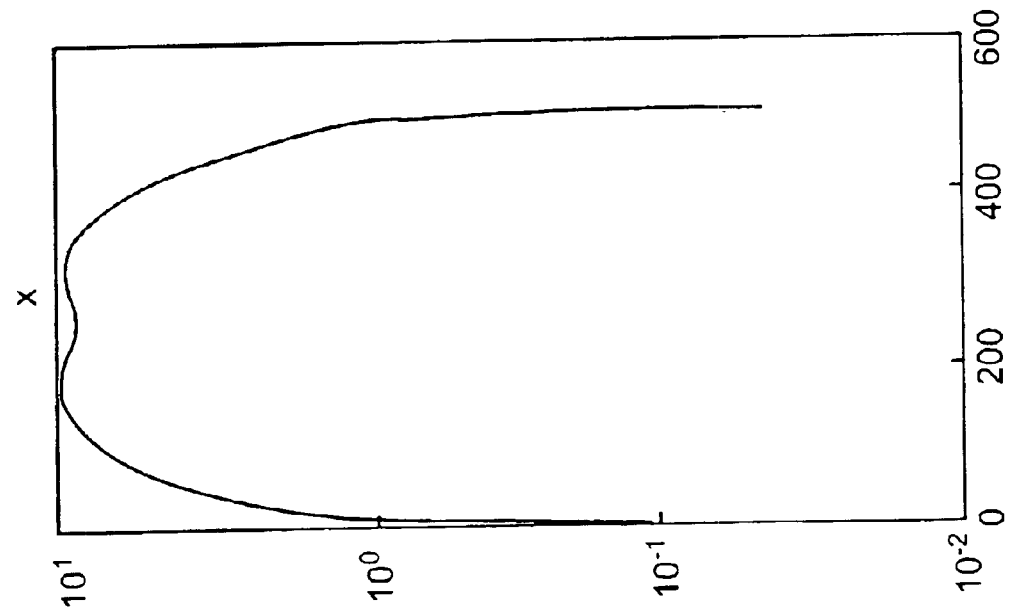

FIGS. 4A–4B are diagrams showing the deviation of symmetry of x and y projections of a correlation function when the images of two different objects are compared. In particular, FIG. 4A illustrates a plot of the deviation of symmetry (in %) versus the distance from the center of symmetry for the x projection of a correlation function. FIG. 4B illustrate a plot of the deviation of symmetry (in %) versus the distance from the center of symmetry for the y projection of the correlation function. A high degree of deviation from symmetry is observed ($10^1$). Accordingly, the compared images are the images of two different objects. The correlation function may be a cross correlation function to compute the degree to which the images differ. The images were not rotated in this case.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of comparing a first image and a second image comprising the steps of:
   (a) compressing the first image into a first image projection;
   (b) compressing the second image into a second image projection;
   (c) determining a deviation of symmetry of the first image projection and the second image projection by the steps of:
      (i) locating a correlation peak $\Delta$;
      (ii) performing a correlation function at a first point near the correlation peak $\Delta+\delta$ to determine a first correlation result;
      (iii) performing the correlation function at a second point near the correlation peak $\Delta-\delta$ to determine a second correlation result;
      (iv) performing the correlation function at the correlation peak $\Delta$ to determine a peak correlation result;
      (v) computing a difference between the first correlation result and the second correlation result;
      (vi) dividing the difference by the peak correlation result to determine the deviation of symmetry; and
   (d) comparing the deviation of symmetry and a predetermined threshold value.

2. The method of claim 1 wherein the step of comparing the deviation of symmetry and a predetermined threshold value determines whether the first image and the second image are the images of a same object.

3. The method of claim 1 wherein the first image is a predetermined reference image and the second image is an acquired image.

4. The method of claim 1 wherein the first and second images are images of a biometric object selected from a group consisting of fingerprints, hand or palm prints, and faces.

5. The method of claim 1 wherein the first image projection and the second image projection are in one dimensional format.

6. The method of claim 1 wherein the step of compressing a first image includes summing pixels of the first image to produce a first image projection.

7. The method of claim 1 wherein the first image projection includes x projection.

8. The method of claim 1 further comprising subtracting a background average constant from the correlation function to reduce background noise in the first and second projections.

9. The method of claim 1 wherein the correlation function includes a displacement parameter to align the first and second images.

10. The method of claim 1 wherein the first projection includes image data sensitive near the correlation peak.

11. A method of authenticating an acquired image of an object comprising the steps of:
    compressing the acquired image into an acquired image projection;
    performing a symmetry process between the acquired image projection and a reference projection of a predetermined reference image to determine a deviation of symmetry;
    authenticating the acquired image by comparing the deviation of symmetry and a predetermined threshold value; wherein the symmetry process comprising the steps of:
       providing a correlation function;
       locating a correlation peak;
       folding the correlation function at about the correlation peak to determine a symmetry of the acquired and reference projections; and
       normalizing the symmetry to determine the deviation of symmetry.

12. The method of claim 11 wherein folding the correlation function comprises performing the correlation function near the correlation peak to determine a first correlation result and a second correlation result, and computing the difference between the first and second correlation results.

13. The method of claim 12 wherein normalizing the symmetry comprises performing the correlation function at the correlation peak, and dividing the difference by the peak correlation result to determine the deviation of symmetry.

14. The method of claim 11 further comprising acquiring the acquired image to be authenticated.

15. The method of claim 11 further comprising storing the predetermined reference image.

16. The method of claim 11 wherein the object includes fingerprints, hand or palm prints, retina scans, signatures and faces.

17. The method of claim 11 wherein the acquired image projection includes image data sensitive at about a correlation peak.

* * * * *